United States Patent [19]

Quednau

[11] Patent Number: 5,399,294
[45] Date of Patent: Mar. 21, 1995

[54] DISPERSING AGENTS, THEIR USE AND SOLIDS COATED THEREWITH

[75] Inventor: P. H. Quednau, Hillegom, Netherlands

[73] Assignee: EFKA-Chemicals B.V., Hillegom, Netherlands

[21] Appl. No.: 634,401

[22] Filed: Dec. 27, 1990

[30] Foreign Application Priority Data

Dec. 29, 1989 [EP] European Pat. Off. ........... 89203342

[51] Int. Cl.$^6$ ...................... C08G 18/30; C08G 18/72
[52] U.S. Cl. ................................... 252/357; 252/351; 528/49; 528/83
[58] Field of Search .................. 252/351, 356, 357; 528/28, 49, 69, 83; 428/52

[56] References Cited

U.S. PATENT DOCUMENTS

| | | | |
|---|---|---|---|
| 3,684,771 | 8/1972 | Braun | 260/77 |
| 3,817,944 | 6/1974 | Jones . | |
| 4,032,698 | 6/1977 | Ashe | 526/14 OR |
| 4,070,388 | 1/1978 | Jones | 560/158 X |
| 4,647,647 | 3/1987 | Haubennestel et al. | 528/83 |
| 4,762,752 | 8/1988 | Haubennestel . | |
| 4,795,796 | 1/1989 | Haubennestel et al. | 528/28 |
| 4,933,417 | 6/1990 | Yamamoto et al. | 528/69 OR |
| 4,942,213 | 7/1990 | Haubennestel et al. | 528/28 |

FOREIGN PATENT DOCUMENTS

| | | |
|---|---|---|
| 0154678 | 1/1984 | European Pat. Off. . |
| 0270126 | 4/1987 | European Pat. Off. . |
| 0318999 | 1/1988 | European Pat. Off. . |
| 890691 | 3/1962 | United Kingdom . |

OTHER PUBLICATIONS

European Search Report, Application No. 90 20 3520, Jun. 6, 1991.

*Primary Examiner*—Robert L. Stoll
*Assistant Examiner*—Daniel S. Metzmaier
*Attorney, Agent, or Firm*—Cooper & Dunham

[57] ABSTRACT

The present invention relates to dispersing agents or their salts, comprising

A the reaction product of one or more polyisocyanates having an average functionality of from 2.0 to 5, with B a mixture from $B_1$ monohydroxyl compounds and $B_2$ monohydroxy-, monocarboxylic acid compounds, or monoamino-, monocarboxylic acid compounds and C a compound containing at least one basic ring nitrogen and an isocyanate-reactive group, in which of the isocyanate groups about 30–70% are reacted with B and about 30–70% with C, and the preparation of such dispersing agents.

16 Claims, No Drawings

DISPERSING AGENTS, THEIR USE AND SOLIDS COATED THEREWITH

FIELD OF THE INVENTION

The present invention relates to dispersing agents or their salts, on the basis of a compound having at least one ring nitrogen-containing basic group.

The invention further relates to the use of the dispersing agents and pulverulent or fibrous solids which are coated with such dispersing agents and are to be incorporated in liquid systems.

BACKGROUND OF THE INVENTION

Powerful mechanical forces are required for introducing solids into liquid media. This depends to a large extent on the ease with which the solid can be wetted by the surrounding medium and on the affinity to this medium. To reduce these dispersing forces, it is customary to employ dispersing agents which facilitate incorporation. These are in most cases surface-active substances, also known as tensides, which have an anion-active or cation-active and nonionic structure. These substances are added in relatively small quantities, either by direct application to the solid or by introduction into the dispersing medium. The effort required for dispersion is substantially reduced by such a tenside.

It is also known that these solids tend to reagglomerate after the dispersion process, thus vitiating the effort previously expended for dispersion and leading to serious problems. This phenomenon is explained by London/van der Waal's forces by which the solids attract each other. To overcome these forces of attraction, it is necessary to apply adsorption layers on the solids. This is achieved by using such tensides.

During and after dispersion, however, an interaction between the solid particle and the surrounding medium takes place and desorption of the tenside occurs, accompanied by its replacement by the surrounding medium, which is present at a higher concentration. This surrounding medium, however, is in most cases not capable of building up such stable adsorption layers, and the whole system breaks down. This manifests itself by a rise in viscosity in liquid systems, loss of gloss and shift in colour tone in lacquers and coatings, insufficient development of colour power in pigmented plastics, and decrease of mechanical strength in reinforced plastics.

European patent application 154,678 discloses a dispersing agent comprising the reaction product of a polyisocyanate having a valence of from 2.5 to 6 with a monohydroxyl compound, a difunctional component and a compound containing a basic ring nitrogen.

Due to the nature of the compounds and the reactions connected therewith, it is essential for the product to be manufactured by a multistage method. With regard to the production efficiency this is not desirable. Moreover, the problem occurs that both the intermediate and the end product are not very stable and tend to gelatinization.

More in particular, it may be noted that it is necessary according to the known method to use a multistage process wherein after stage 1, in which the polyisocyanate must first be reacted with the monomer compounds, a difunctional compound cannot be used until in stage 2. If this uneconomical process is not used and the components from stages 1 and 2 are therefore reacted from the beginning, complications will occur in process stage 3 to the extent of a substantial formation of gel particles and a gelatinization of the entire mass.

The intermediate resulting from reaction stages 1 and 2, which is reacted in stage 3 with compounds of formula III to obtain a ready-for-delivery product, only has a limited shelf life (about 24 hours) and is therefore not suitable for supply as a basis for further addition reactions.

The products manufactured by the process described show a marked tendency towards gelatinization in the third reaction stage so that these reactions can only be effected in highly diluted solutions, resulting in end products which only have a relatively low solid content. The increase in solid by subsequent vacuum distillation is not possible in view of the marked tendency towards coagulation.

The known dispersing agents further have a compatibility, a solubility and a dispersing activity which are not very good.

It is an object of the present invention to provide dispersing agents which, as compared with the known dispersing agents, have improved properties, in particular improved compatibility with binding agents, improved solubility and improved dispersing activity.

It is further an object of the present invention to provide dispersing agents which do not have the above disadvantages with regard to their preparation or to a substantially less extent, and which particularly result in dispersions of solids which do not tend, or only to a minor degree, to reagglomerate after the dispersion process.

SUMMARY OF THE INVENTION

It has now surprisingly been found that this problem may be solved by means of the dispersing agents defined below.

The invention thus relates to dispersing agents or their salts comprising

A the reaction product of one or more polyisocyanates having an average functionality of 2.0 to 5, with B a mixture from $B_1$ monohydroxyl compounds, and $B_2$ monohydroxy-, monocarboxylic acid compounds, or monoamino-, monocarboxylic acid compounds, and C a compound containing at least one basic ring nitrogen and an isocyanate-reactive group, wherein of the isocyanate groups about 30–70% are reacted with B and about 30–70% with C.

It has now surprisingly been found that the dispersing agents according to the invention show a better compatibility with, e.g., alkyd resins and oil-free polyester resins, a better solubility and a better dispersing activity of different pigments that are hard to stabilize.

The above advantages are very important in using these dispersing agents. In consequence thereof, the binding agents can be better used for the dispersion of pigments in binding agents. More in particular, the better solubility offers the possibility of using the dispersing agents in high-solids lacquers because it is advantageous in such systems to use fewer solvents.

When monohydroxycarboxylic acids or monoaminocarboxylic acids are used instead of the known di- and trimeric compounds described, the following advantages can be obtained in the preparation of the dispersing agents:

The laborious and uneconomical 2-stage process for preparing the intermediate described in European patent application 154,678 can be carried out in one stage when using monohydroxycarboxylic acids without the occurrence of gelatinization with the reaction in the third stage.

The initial products manufactured with monohydroxycarboxylic acids or monoaminocarboxylic acids have a substantially improved shelf life (several weeks) so that the most different end products can be manufactured from an intermediate, also after a prolonged intermediate storage.

DETAILED DESCRIPTION OF THE PREFERRED EMBODIMENTS

In view of the low tendency towards gelatinization in the third reaction stage, it is possible to manufacture end products having an increased solid content, which is advantageous in the manufacture of lacquers having a high solid content.

According to the invention a polyisocyanate having a functionality of from 2,0 to 5, preferably about 4, is used in the dispersing agents. Suitable polyisocyanates are those which may be obtained, e.g., by the addition of diisocyanates to polyols, trade product: DESMODUR L (TM), having the formula

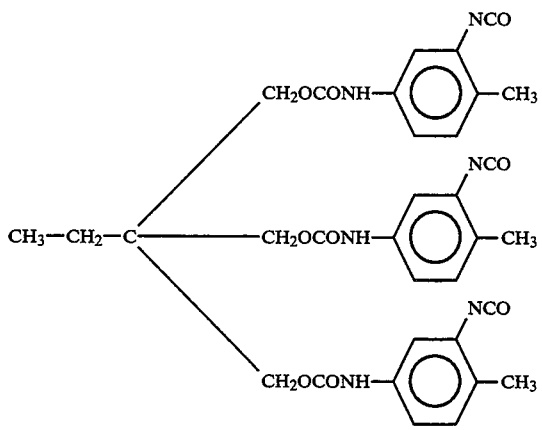

or which may be obtained by the biuret reaction, trade product: DESMODUR N (TM), having the formula

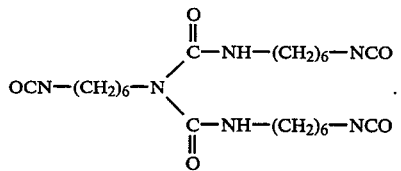

or the polyisocyanates obtainable by the cyclization of diisocyanates and having an isocyanurate basic structure, trade product: DESMODUR HL (registered trade mark), having the formula

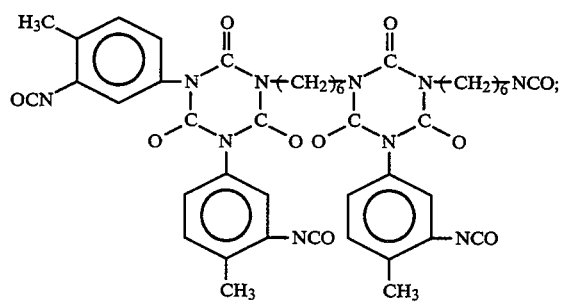

trade product: DESMODUR IL (registered trade mark), having the formula

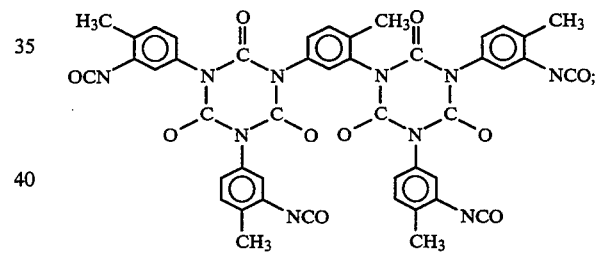

trade product: POLURENE KC (registered trade mark), having the formula

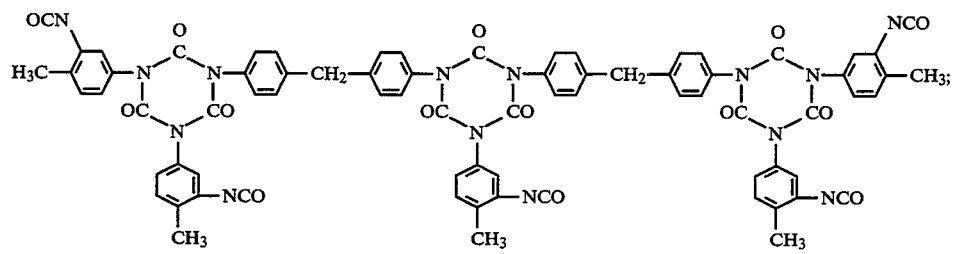

trade product: POLURENE HR (registered trade mark), having the formula

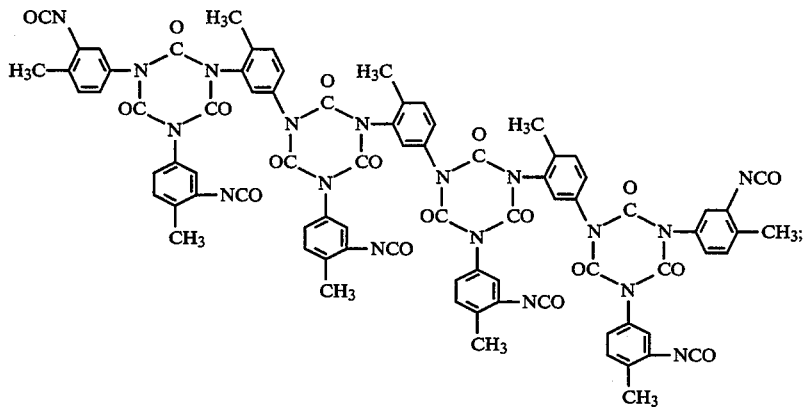

toluylene diisocyanate-isophorone diisocyanate cyanurate, having the formula

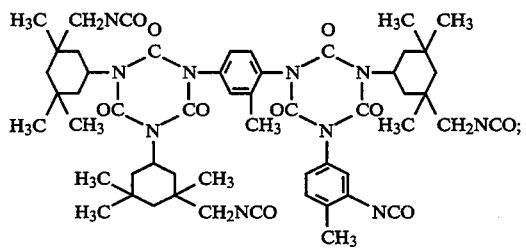

or trimeric isophorone diisocyanate (isocyanurate T1890 of Chemische Werke Hüls). having the formula

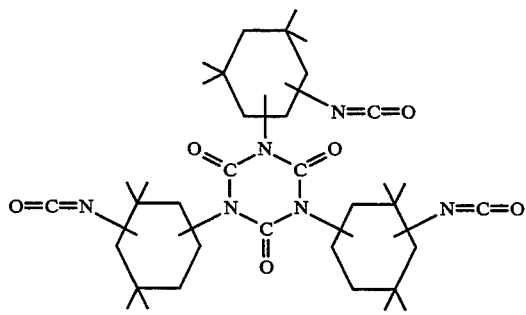

As already mentioned above, the relevant compounds are trade products which frequently do not have the above chemical formulae in their pure form but are mixtures of certain compounds of a similar structure. By average functionality is meant that with regard to the isocyanate groups, the trade products have the given functionality of from 2.0 to 5, preferably about 4.

The mixture of hydroxyl compounds anyhow contains at least one monohydroxyl compound with an aliphatic and/or cycloaliphatic hydrocarbon which may or may not be substituted with aryl and/or halogen groups, or may contain one or more ether and/or ester groups. Preferably, the monohydroxyl compound has a molecular weight of at least 500 and more in particular of from 750 to 3500. An optimum dispersing activity is obtained with these molecular weights. It is also possible to incorporate one or more substituents in the monohydroxyl compound which increases the compatibility with alkyd resins.

It may be important that in addition to the hydroxyl group the relevant monohydroxyl compound has no substituents reactive with isocyanates under the conditions of preparation of the dispersing agent according to the invention.

The monohydroxyl compounds used may be aliphatic, cycloaliphatic and/or araliphatic compounds. Mixtures of such compounds may also be used. Straight chained and branched aliphatic or araliphatic compounds may be used. They may be saturated or unsaturated. Saturated compounds are preferred. The hydrogen atoms may be partly replaced by halogens, preferably by fluorine and/or chlorine. When such substituted compounds are used, they are preferably aliphatic monoalcohols. Such products are commercially available and the carbon atoms close to the hydroxyl group, as is well known to those skilled in the art, generally have no halogen atoms. Examples of specially fluorinated alcohols include heptadecafluorodecanol or $C_6F_{13}CH_2CH_2OH$. The commercially available corresponding products are frequently not uniform but mixtures of different fluorinated compounds as obtained from technical synthesis.

The monohydroxyl compounds may also contain at least one —O— and/or COO— group, which means they are polyethers, polyesters or mixed polyether-polyesters. Examples of polyesters include those which may be obtained by the polymerization of a lactone such as propiolactone, valerolactone, caprolactone or substituted derivatives thereof, using a monohydroxyl starting component. The starting components used are monoalcohols, suitably with 4 to 30, preferably 4 to 14 carbon atoms, such as n-butanol, relatively long-chained, saturated and unsaturated alcohols such as propargyl alcohol, oleyl alcohol, linoloyl alcohol, oxo alcohols, cyclohexanol, phenyl ethanol, neopentyl alcohol, but also fluorinated alcohols of the kind mentioned above. Alcohols of the type described above and substituted and unsubstituted alcohols may also be converted into polyoxyalkylene monoalkyl-, aryl-, aralkyl- and cycloalkyl ethers by known methods of alkoxylation with ethylene oxide and/or propylene oxide, and these monohydroxypolyethers may be used in the manner prescribed as starting components for lactone polymerisation. Mixtures of the above-mentioned compounds may be used in all cases. These polyesters suitably have a molecular weight within the range of from about 300 to 8000, preferably 500 to 5000.

There may also be used monohydroxypolyethers obtained by the alkoxylation of alkanols, cycloalkanols and phenols. These polyethers suitably have a molecular weight within the range of from about 350 to 1500.

The mixture of hydroxyl compounds also contains at least one monohydroxy-monocarboxylic acid compound. Preferably, a hydrocarbon compound is suitably used with at least 8 carbon atoms contained between the hydroxyl group and the carboxylic acid group. If desired, this carbon chain may be interrupted by amide, ether, ester, S, $SO_2$ and/or urethane groups. To improve the compatibility of the dispersing agent with different materials, it is generally preferred that the molecular weight of the monohydroxy-monocarboxylic acid compound is at least 500, more in particular of from 750 to 4000.

Suitable monohydroxy-monocarboxylic acid compounds may be obtained by the esterification of hydroxycarboxylic acids, by the reaction of a diol with a dicarboxylic acid or an anhydride. It is possible to start from a diol of higher molecular weight such as a polyethylene glycol and to react it with a single dicarboxylic acid or a dicarboxylic anhydride. It is also possible to react a dicarboxylic acid of high molecular weight with a diol of low molecular weight. Finally, it is also possible to react almost stoichiometric quantities of diol of low molecular weight and dicarboxylic acid of low molecular weight with each other under such conditions as to form as much monohydroxy-monocarboxylic acid as possible and anyhow no or substantially no dihydroxyl compound. Preferred is the use of the reaction product of dicarboxylic acid of low molecular weight with a diol of higher molecular weight such as polyethylene glycol.

The monohydroxy-monocarboxylic acids may be replaced in whole or in part by monoamino-monocarboxylic acids. Analogous remarks apply to the monoamino-monocarboxylic acid as to the monohydroxycarboxylic acid.

The ratio of the quantities of hydroxyl groups contained in, on the one hand, the monohydroxyl compound and, on the other hand, the monohydroxy-monocarboxylic acid compound may vary within relatively broad limits, depending on their use. Preferably, the monohydroxy-monocarboxylic acid compound is present in a deficiency with respect to the monohydroxyl compound. The ratio of the number of hydroxyl groups originating from both types of compounds varies from 1:1 to 10:1. Preferably, this ratio ranges from 2:1 to 5:1. When using a monoamino-monocarboxylic acid compound, the ratio of the number of hydroxyl groups from the monohydroxyl compounds and the number of amino groups is from 1:1 to 10:1. Preferably, this ratio is from 2:1 to 5:1.

An important component in the dispersing agent according to the invention is a compound containing a basic ring nitrogen. Suitable compounds are: N,N-diethyl-1,4-butanediamine, 1-(2-aminoethyl)-piperazine, 2-(1-pyrrolidyl)ethylamine, 4-amino-2-methoxy-pyrimidine, 2-dimethylaminoethanol, 1-(2-hydroxyethyl)-piperazine, 4-(2-hydroxyethyl)-morpholine, 2-mercaptopyrimidine, 2-mercaptobenzimidazole. Particularly preferred are N,N-dimethyl-1,3-propanediamine, 4-(2-aminoethyl)-pyridine, 2-amino-6-methoxybenzothiazole, 4-(aminoethyl)-pyridine, N,N-diallyl-melamine, 3-amino-1,2,4-triazole, 1-(3-aminopropyl)-imidazole, 4-(2-hydroxyethyl)-pyridine, 1-(2-hydroxyethyl)-imidazole, 3-mercapto-1,2,4-triazole.

Characteristic of these compounds is that per molecule they contain at least one Zerewitinoff hydrogen atom, which preferably reacts with the isocyanate groups, and that they in addition contain a basic group which contains nitrogen and which is not capable of reacting with isocyanate groups to form urea. These basic groups are also characterised according to the state of the art by their pKa-value (compare U.S. Pat. Nos. 3,817,944; 4,032,698 and 4,070,388). Compounds with basic groups having a pKa-value of from 2 to 14 are preferred, especially those with pKa-values of from 5 to 14 and most especially those with pKa-values of from 5 to 12. The pKa-value can be obtained from tables. The limiting values given above refer to the measurement of the pKa-value at 25° C. at an 0.01 molar concentration in water. These basic groups also impart a basicity to the addition compounds according to the invention, as is also known in this field of the art (compare the above-mentioned U.S. patent specifications). Due to these basic groups, the addition compounds are capable of salt formation. According to the invention, they may also be used in the form of such salts as dispersing agents.

These salts are obtained from the resulting reaction product by neutralisation with organic or inorganic acids or by quaternisation. Salts with organic monocarboxylic acids are preferred.

It is to be noted that it may also be possible to incorporate a minor quantity of a dihydroxyl compound in the dispersing agent according to the invention. The quantity thereof is, however, always such that only a fraction, i.e. less than 5%, preferably less than 2.5% of the isocyanates groups is reacted therewith. Preferably, however, no dihydroxyl compound is present.

The reaction of isocyanate groups takes place by applying known methods. In general, it is preferred to carry out the reaction in such a manner that in a first stage the polyisocyanate is reacted with a mixture of a monohydroxyl compound and a monohydroxy-monocarboxylic compound. This reaction generally occurs in a suitable solvent (e.g. hydrocarbons such as xylenes, ethers such as dioxane, esters such as butyl acetate, and dimethylformamide), optionally in the presence of a catalyst such as dibutyltin dilaurate, iron acetyl acetonate or triethylenediamine. It is also possible, but not preferred, to first react the polyisocyanate with the monohydroxyl compound and to further react the resulting reaction product with the carboxylic acid compound.

After this reaction, in which in general about 40–80% of the isocyanate groups will be reacted, the reaction is carried out with a compound containing a basic ring nitrogen. This will lead to a reaction of about 20–60% of the isocyanate groups. Isocyanate groups that may not have reacted are finally deactivated by the reaction with a lower alcohol or a comparable compound. Particularly butanol is suitably used.

The invention will now be illustrated by some examples but is not limited to them.

Example of preparation A 31.92 g caprolactone, 10.40 g HD-Ocenol 45/50 (Henkel & Cie., Düsseldorf) are dispersed under an inert gas. 0.0012 g dibutyltin dilaurate are added and heated to 170° C. with stirring until a solid of 99% is obtained (about 8 hours). The product is solid at room temperature and slightly yellowish in colour.

Example of preparation B 60.0 g polyethylene glycol having the average molecular mass of 1000 are molten under an inert gas. 17.10 g tetrachlorophthalic anhydride are added with stirring and heated to 150° C. The reaction is completely terminated as soon as an acid number of 43.6 is obtained; duration about 4 hours. The product is waxy at room temperature and is whitish-yellowish in colour.

Example of preparation C 75.00 g polyethylene glycol having the average molecular mass of 1000 are molten with introduction of nitrogen. When the diol becomes liquid, 11.10 g phthalic anhydride are added and heated to 150° C. with stirring. The reaction is completely terminated when an acid number of 48.87 is obtained. The product is waxy at room temperature.

Example of preparation D 394 g pentahydro-perfluorononanediol are molten. 266.30 g dodecenyl succinic anhydride are added under an inert gas and with stirring and heated to 150° C. The reaction is completely terminated as soon as an acid number of 96 mg KOH/g is obtained. The resinous product is yellow in colour; it is used in 70% form as a solution in methoxypropyl acetate.

Example 1

41.06 g of a caprolactone polyester (Example A) and 63.00 g Desmodur IL (51% in butyl acetate) are dissolved in 42.48 g butyl acetate and 40.99 g methoxypropyl acetate with introduction of an inert gas and stirring. Then 1205 g monohydroxycarboxylic acid (Example of preparation C) are added and the formulation is heated to 70° C. After a reaction time of 2 hours the addition has occurred, which is recognisable at the NCO content. 32.44 g of a 20% solution of 2-amino-4-methylpyridine in MNP are added and further stirring takes place for 1 hour. At the end, an excess of n-butanol is added to react NCO groups that are not reacted. The viscous end product is yellowish in colour and has a solid content of 39.54%.

In a parallel mode of experimental procedure the equivalent proportion of polyethylene glycol 1000 ( 10.50 g) was used instead of the monohydroxycarboxylic acid. Here addition of the 2-amino-4-methylpyridine solution already led to gelatinization after only 50% of the solution had been added!

Example 2

23.27 g of a caprolactone polyester (Example of preparation A) and 42.00 g Desmodur IL (51% in butyl acetate) are dissolved in 30.62 g butyl acetate and 36.02 g methoxypropyl acetate with introduction of nitrogen and stirring. Then 7.68 g monohydroxycarboxylic acid (Example B) are added and the formulation is heated to 70° C. After the addition (about 2 hrs) has ocurred, 15.11 g of a 16.67% NMP solution of 3-amino-1,2,4-triazole are added and further stirring takes place for one hour. At the end, an excess of n-butanol is added to react NCO groups that are not reacted. The product has medium viscosity and is light yellow in colour.

In a parallel formulation 7.00 g polyethylene glycol 1000 were used instead of the 7.68 g monohydroxycarboxylic acid. Here addition of the 3-amino-1,2,4,-triazole solution led to complete gelatinization of the mass, so that it was unsuitable for use.

Example 3

4.42 g of a caprolactone polyester (Example A) and 8.40 g Desmodur IL (51% in butyl acetate) are dissolved in 6.12 g butyl acetate and 7.20 g methoxypropyl acetate with introduction of nitrogen and stirring. Then 1.71 g monohydroxycarboxylic acid (Example B) are added and the formulation is heated to 70° C. After a reaction time of 2 hours the addition has occurred, which is recognisable at the NCO content. A mixture of 0.75 g 1-(3-aminopropyl)-imidazole dissolved in 2.95 g of N-methylpyrrolidone is added and further stirring takes place for one hour. At the end, an excess of n-butanol is added to react NCO groups that are not reacted. The product is light yellow in colour and viscous.

In a parallel formulation 1.40 g of polyethylene glycol 1000 were added instead of the 1.71 g of monohydroxycarboxylic acid. In this formulation, addition of the 1-(3-aminopropyl)-imidazole NMP solution led to gelatinization, so that the product was unsuitable for use.

Example 4

In a synthesis apparatus 25.39 g caprolactone polyester (Example A) and 42.00 g Desmodur IL (51% in butyl acetate) are dissolved in 38.31 g butyl acetate and 33.32 g methoxypropyl acetate with introduction of nitrogen and stirring. Then 6.58 g monohydroxycarboxylic acid (Example B) and 1.89 g monohydroxycarboxylic acid solution (Example D) are added and the formulation is heated to 70° C. After a reaction time of 2 hours the addition has occurred, which is recognisable at the NCO content. 14.10 g butyl acetate and 14.10 g methoxypropyl acetate are added, to which 21.94 g of a 22.79% solution of 1-(3-aminopropyl)-imidazole in NMP are added, and further stirring takes place for one hour. At the end, an excess of n-butanol is added to react NCO groups that are not reacted. The viscous end product is straw yellow in colour.

We claim:
1. Dispersing agents or salts, thereof, comprising: the reaction product of
   A. one or more polyisocyanates having an average functionality of from 2.0 to 5, with
   B a mixture of
      $B_1$ at least one monohydroxyl compounds selected from the group consisting of monohydroxyl compounds with an aliphatic hydrocarbon, monohydroxyl compounds with an aliphatic hydrocarbon substituted with aryl groups, monohydroxyl compounds with an aliphatic hydrocarbon substituted with halogen groups, monohydroxyl compounds with a cycloaliphatic hydrocarbon, monohydroxyl compounds with a cycloaliphatic hydrocarbon substituted with aryl groups, and monohydroxyl compounds with a cycloaliphatic hydrocarbon substituted with halogen groups, and
      $B_2$ at least one monohydroxy-monocarboxylic acid compound, the monohydroxy-monocarboxylic acid compound obtained by esterification of hydrocarboxylic acids or by reaction of a diol with at least one dicarboxylic acid or anhydride compound,
   to form an intermediate, followed by reacting the intermediate with

C. a compound containing at least one basic ring nitrogen and a group which is capable of reacting with an isocyanate group, wherein about 30–70% of the isocyanate groups of the polyisocyanates are reacted with $B_1$ and $B_2$ and about 30–70% with C.

2. Dispersing agents according to claim 1, wherein the at least one monohydroxyl compound contains ether groups.

3. Dispersing agents according to claim 1, wherein the monohydroxyl compound contains ester groups.

4. Dispersing agents according to claim 1, wherein the monohydroxyl compound has a molecular weight of at least 500.

5. Dispersing agents according to claim 4, wherein the at least one monohydroxyl compound has a molecular weight ranging from 750 to 3500.

6. Dispersing agents according to claim 5, wherein the carbon chain includes amide, ether, ester, S, $SO_2$ or urethane groups.

7. Dispersing agents according to claim 1, wherein the at least one monohydroxy-monocarboxylic acid compound having at least eight carbon atoms contained between the hydroxyl group and the carboxylic acid group.

8. Dispersing agents according to claim 1, wherein the molecular weight of the monohydroxy-monocarboxylic acid compound is at least 500.

9. Dispersing agents according to claim 8, wherein the monohydroxyl compound has a molecular weight of from 750 to 3500.

10. Dispersing agents according to claim 8, wherein the molecular weight of the monohydroxy-monocarboxylic acid compound is from 750 to 4000.

11. Dispersing agents according to claim 1, wherein the amount of monohydroxy-monocarboxylic acid compound is less than the amount of monohydroxyl compound.

12. Dispersing agents according to claim 11, wherein the ratio of the number of hydroxyl groups of monohydroxyl compound to the number of hydroxyl groups of monohydroxymonocarboxylic acid compound varies from 2:1 to 5:1.

13. Dispersing agents according to claim 11 wherein the compound containing at least one basic ring nitrogen and group capable of reacting with an isocyanate group is 1-(2-aminoethyl)-piperazine, 2-(1-pyrrolidyl)-ethylamine, 4-amino-2-methoxy-pyrimidine, 2-dimethylaminoethanol, 1-(2-hydroxyethyl)-piperazine, 4-(2-hydroxyethyl)-morpholine, 2-mercaptopyrimidine, or 2-mercaptobenzimidazole.

14. Dispersing agents according to claim 1, wherein the ratio of the number of hydroxyl groups of the at least one monohydroxyl compound to the number of hydroxyl groups of monohydroxy-monocarboxylic acid compound ranges from 1:1 to 10:1.

15. Dispersing agents according to claim 1, wherein per molecule of the compound containing said at least one basic ring nitrogen contains at least one Zerewitinoff hydrogen atom reactive with the isocyanate groups, and wherein the nitrogen-containing basic group is not capable of reacting with isocyanate groups to form urea.

16. Dispersing agents according to claim 1, wherein the compound containing at least one basic ring nitrogen and group capable of reacting with an isocyanate group is 4-(2-aminoethyl)-pyridine, 2-amino-6-4-(2-aminoethyl)-pyridine, 2-amino-6-methoxybenzothiazole, 4-(aminoethyl)-pyridine, N,N-diallylmelamine, 3-amino-1,2,4-triazole, 1-(3-aminopropyl)-imidazole, 4-(2-hydroxyethyl)-pyridine, 1-(2-hydroxyethyl)-imidazole, or 3-mercapto-1,2,4-triazole.

* * * * *